June 1, 1971  A. F. TRAGESSER, JR  3,582,375
WELL CEMENTING COMPOSITION
Filed March 21, 1968
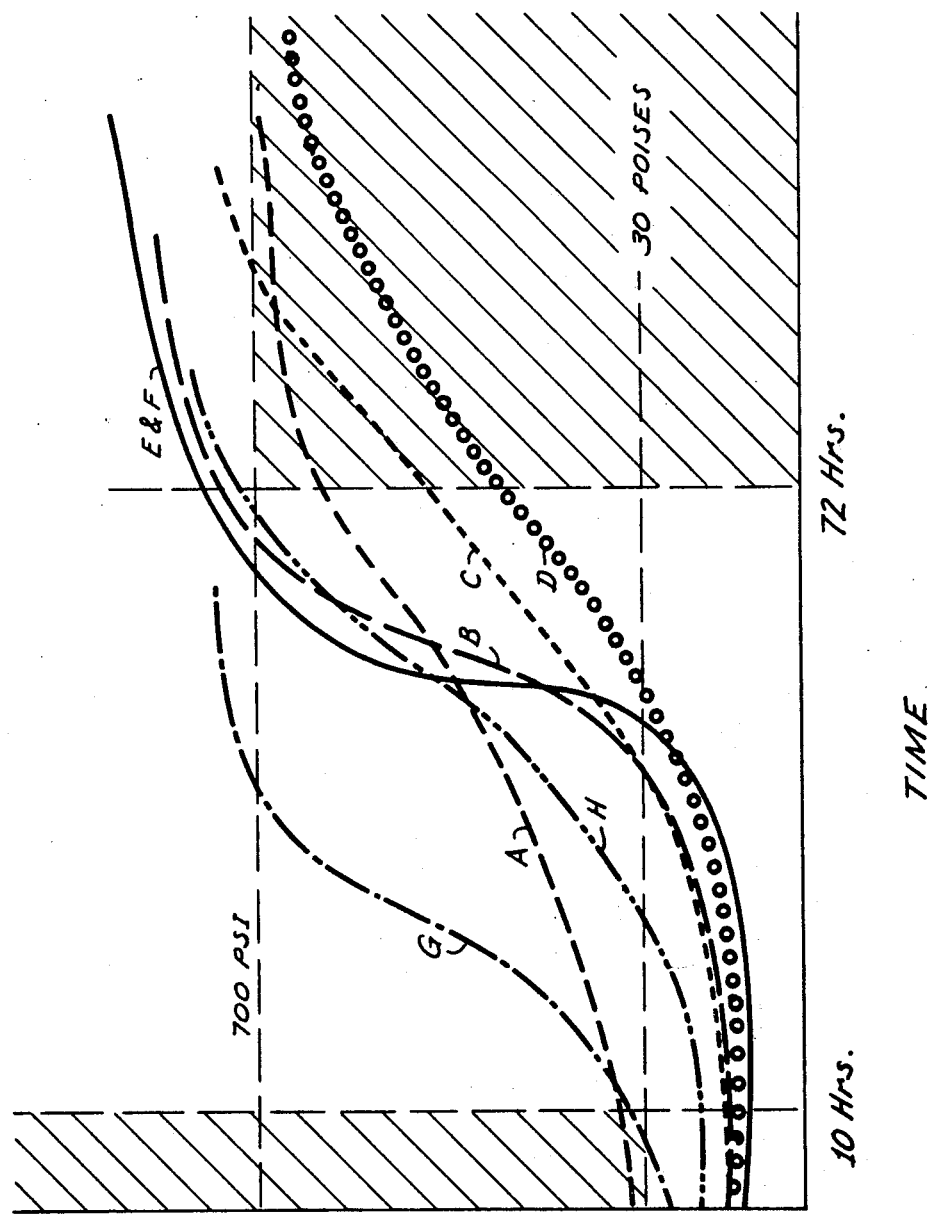
Arthur F. Tragesser, Jr.
INVENTOR.
BY
ATTORNEY

United States Patent Office

3,582,375
Patented June 1, 1971

3,582,375
WELL CEMENTING COMPOSITION
Arthur F. Tragesser, Jr., Houston, Tex., assignor to The Western Company of North America, Fort Worth, Tex.
Filed Mar. 21, 1968, Ser. No. 716,701
Int. Cl. C04b 7/02, 13/24
U.S. Cl. 106—90          6 Claims

ABSTRACT OF THE DISCLOSURE

A cement slurry composition especially designed for the setting of multiple strings of tubing in a multiple completion well wherein the setting of the cement is retarded for at least 10 hours, comprising an oil-well cement and from 10 to 16 percent of clay together with relatively small proportions of retarding and dispersing agents, no fluid loss additives, and no more than about 100 percent water, based on the dry weight of cement.

BACKGROUND OF THE INVENTION

(1) Field of the invention

This invention relates to cement compositions for cementing of oil and gas wells and more particularly it relates to cement compositions especially suitable for the cementing of tubing in multiple completion wells.

(2) Description of the prior art

It has for many years been the practice to pump cement compositions into oil and gas wells for cementing the well casing. Various special cement compositions have been formulated to meet requirements established for satisfactory performance in the cementing of such well casings. Such requirements include high strength, low fluid loss from the cement slurry, comparatively low viscosity for a period sufficient to pump the cement into the well, and relatively fast setting of the cement once it has been placed into position in the well. Examples of cements developed for this purpose may be seen in U.S. Pats. 2,582,459 and 3,071,481.

Recently, in the completion of oil wells with multiple parallel strings of tubing in the wells, it has been the practice to pump the cement slurry down into the well through the first string of tubing which is set, and then to lower the other strings of tubing into the cement slurry before it hardens. It takes a number of hours to perform the operation of lowering the other strings of tubing into place and, therefore, it is necessary that the cement slurry not harden for an appreciable period of time, usually from 10 to 30 hours.

The industry has specified that the cement used for cementing of tubing in multiple completion wells shall have a fluid loss of not in excess of 120 cc. in 30 minutes under the test described in pages 6 and 7 of the American Petroleum Institute Bulletin API RP 10B. In addition, industry has required that the hardened cement have a compressive strength of at least 700 p.s.i. after 72 hours. As previously stated, the cement is required to be readily pumpable, that is with a viscosity of no more than about 30 poises, and setting is required to be delayed for from 10 to 30 hours.

Accordingly, certain cement slurry compositions have been formulated in which the setting of the cement is delayed for an appreciable period. As in previous applications of the cement slurries in oil wells, however, there is still a requirement of low fluid loss from the slurry under the high pressures encountered in oil wells, as well as the requirement for high compressive strength of the hardened cement. Furthermore, the slurry must have a relatively low viscosity so that it can be handled easily by the cement slurry handling equipment which is available.

The cement slurries which have been formulated to meet these rather exacting requirements have been quite expensive because of the ingredients necessary to be used.

In the compounding of cement slurries for oil well use, it has long been the practice to add hydratable bentonitic clays to the slurry in small amounts. Cements containing hydratable clays are commonly referred to as gel cements, and the percent clay in the cement is ordinarily used to identify the cement. Thus a gel cement containg 8 percent colloidal clay is referred to as an 8 percent gel cement. The incorporation of bentonitic clays in a cement slurry will permit the addition of extra water, and will, without impairing the stability of the cement slurry, greatly increase the volume of the slurry and reduce the cost of a given volume of slurry by a substantial amount. The incorporation of these hydratable clays in cement slurries also reduces the density of the slurries, improves the perforating properties of the set cement, reduces the rate of filtration of liquid from the cement slurry, and helps to form a smooth easily pumpable cement slurry. From the standpoint of these factors, therefore, higher proportions of clay are desirable.

A drawback on the use of large amounts of clay in cement slurries is that an increase in the amount of clay causes a marked increase in the viscosity of the slurry so that it is difficult to pump. If sufficient water is added to the slurry to give it a viscosity in a range that allows the slurry to be readily handled in the equipment ordinarily available, the solids settle from the liquid during setting of the cement and the hardened cement has a very low compressive strength. To offset this difficulty, fluid loss additives, such as sodium carboxymethyl hydroxyethyl cellulose have been used to prevent the solids from separating from the liquid.

Viscosity problems have also been improved by adding dispersing agents, such as soluble salts of sulfonic acid compounds having a plurality of aromatic nuclei joined to an aliphatic nucleus, as are more fully described in U.S. Pat. 2,141,569. A preferred dispersing agent is the sodium salt of a sulfonated naphthalene, which may be prepared by direct sulfonation, or by condensing sulfonic acids of naphthalene with formaldehyde, or its equivalents.

It has also been the practice to retard the setting of the cement by adding such materials as the salts of lignin sulfonic acids. By retarding the setting of the cement, such materials also have the effect of preventing the workability or plasticity of the slurry from deteriorating, particularly after the slurry has been mixed for a while. However, such retarding agents have only a minor effect on viscosity of the slurry.

The above-described dispersing agents also have a relatively minor retarding effect, but this effect is substantially subsidiary to their effect on increasing the plasticity of the cement slurry.

However, even with such additives, usually no more than about 8 percent clay can be used in a cement composition suitable for the setting of tubing in a multiple completion well. Furthermore, such compositions are inordinately expensive because of the high proportion of cement and also because of the necessity of using high proportions of expensive additives.

Compositions which have previously been used are generally as follows:

Class H cement—100#
Clay—8.0%
Sodium carboxymethyl hydroxyethyl cellulose—0.5–1.5%
Sodium salt of sulfonated naphthalene—0.5–1.5%
Calcium ligneous sulfonate—0.1–1.0%

All percentages are based on the weight of dry cement in the slurry. Thus 8 lbs. of clay were used for each 100 lbs. of dry cement. The cement used was Class H cement, and 88 lbs. of water were required per 100 lbs. of cement (46 lbs. of hydrate neat cement plus 5.3 lbs. for each pound of clay).

This composition is excellent for the purpose, but its cost is nearly $2.00 per cubic foot, so that it is highly desirable to develop a lower cost slurry which performs as well. Attempts to reduce the cost by increasing the proportion of clay in the above compositions failed because the slurry required substantially greater proportions of water (an additional 5.3 lbs. per lb. of clay), fluid loss was too high and compressive strength too low.

Thus the prior art teachings are to the effect that higher proportions of clay cannot economically be used in a cement which have a low fluid loss, a long pumping period, and a high compressive strength, because the addition of clay requires the addition of water, which reduces strength and requires the addition of large proportions of expensive chemicals to prevent excessive fluid loss.

BRIEF DESCRIPTION OF THE DRAWING

The single figure of the drawing illustrates characteristics of cements of this invention.

SUMMARY OF THE INVENTION

According to the present invention, a cement slurry composition is provided which is ideally suited for the setting of tubing in a multiple completion well and which can be prepared at a cost substantially less than that of cement slurries previously available for this purpose. The cement slurry of this invention has a substantially higher proportion of clay than has heretofore been thought useable for this purpose and contains smaller proportions of additives and less water than have previously been thought to be necessary in such cement compositions.

The cement composition of this invention is preferably made up of Class H oil-well cement, from about 10 to about 16 percent clay, and usually from about 0.3% to about 0.75% each of a dispersing agent and a retarding agent. No fluid loss control additive is required or desirable in the slurry. The slurry contains substantially less water than slurries previously prepared, but yet is still of a comparatively low viscosity and remains pumpable for a substantially longer period of time. A preferred composition contains only about 80 to 90 lbs. of water per 100 lbs. of cement as opposed to the usual 46 lbs. plus 5.3 lbs. per pound of clay.

DESCRIPTION OF THE PREFERRED EMBODIMENTS

The cements from which the novel cement compositions of this invention are prepared are described in the publication entitled "API Specification for Oil-Well Cements and Cement Additives" (API STD 10–A, 6th edition, January 1959) published by the American Petroleum Institute, and the preferred cement is a cement of Class H as described in the said specification. Other portland cements such as Classes A, B, E, F and G may also be used, however, under suitable circumstances.

The clay mixed with the cement in the preparation of the novel cement compositions is a colloidal hydratable swelling type clay. Such clays are of the bentonite group, particularly montmorillonite, and are widely used in the drilling of gas and oil wells to modify the characteristics of drilling muds. The clays satisfactory for use in this invention have been used commercially in the preparation of the low gel cements heretofore used in oil-well cementing. The preferred clay for use in the compositions of this invention is that known as high yield Wyoming bentonite, which is a relatively pure sodium montmorillonite. So-called low yield bentonites, which contain calcium montmorillonite, do not expand as much as give a lower strength hardened cement. Low yield clays can be converted to a treated high yield bentonite by causticizing, and these treated high yield clays are suitable for some applications of the composition of the present invention, although the causticizing agents have some undesirable effects in some instances.

According to the present invention, the colloidal clay is mixed with the dry cement in amounts ranging from about 10 to about 16 percent by weight of the dry cement. As previously pointed out, the concentration of the clay in the cement composition is a major factor in the determination of the amount of water which must be added to prepare the cement slurry, controls the total volume of cement slurry obtained per sack of cement, and also influences the viscosity of the cement slurry and the strength of the hardened cement. The term "volume" is used to designate the cubic measure of slurry quantity obtained from a given amount of dry cement. Thus, cement slurry costs decrease as the clay concentration increases, and it is desirable to use cement slurries having the highest possible clay concentration commensurate with acceptable performance properties of the cement. Because the viscosity of the cement slurry increases, and the strength of the hardened cement decreases, as the clay concentration is increased, there is a maximum clay concentration above which gel cements are not suitable for cementing oil wells. Previously, gel cement slurries of satisfactory characteristics for the setting of multiple strings of tubing in a multiple completion well could be prepared only with clay concentrations of no more than about 8 percent. According to the present invention, however, satisfactory gel cement slurries can be prepared with clay concentrations of 10 percent to 16 percent or more.

According to the present invenion, only a relatively small proportion of water is used in the cement slurry. API bulletin RP 10B recommends the use of 38% water with Class H cement, and the addition of 5.3% water for each percent of bentonite used. It has been the practice, however, to use 46% water plus 5.3% for each percent of bentonite. Thus for a 12% gel cement API would recommend 101.6% water, and the practice in the field would indicate a requirement for 109.6% water. API would recommend 125.8% water in a 16% gel cement, and field practice would indicate that 133.8% is required. Such large proportions of water, however, result in undesirably high fluid loss from the cement slurry in the well, so that it would be necessary to use high proportions of additives to reduce the fluid loss. The problem of fluid loss is greatly enlarged in the cementing of multiple completion wells, because it is sometimes necessary for the slurry to remain in a pumpable condition in the well for up to 30 hours from the time the slurry is mixed. If fluid loss is not carefully controlled throughout this period, pumpability is decreased as liquid drains into the surrounding formation, so that other strings of casing cannot be run into the slurry, and at least some portions of the cement become dehydrated to the point that a high-strength set cement cannot be obtained.

It has now been found that fluid loss during the setting of casing in a multiple completion well can be reduced to a negligible amount by limiting the amount of water used to make the cement slurry, even with high gel cements. According to this invention, no more than 100%, and preferably no more than about 90% of water is used to make cement slurries containing from 10% to 16% bentonite. Thus up to twice as much bentonite may be used in the cement without increasing the amount of water used. Under some circumstances good results can be obtained with as low as about 65% water, although preferably at least about 75% water is used.

Dispersing agents are added to the cement slurry composition to lower the viscosity of the slurry obtained upon mixing the ingredients with water, and retarding agents are added to retard the setting of the cement. The preferred dispersing agents are the previously described soluble salts of aromatic sulfonic acids. For example, the sodium salt of the condensation product of sulfonated naphthalene and formaldehyde is a preferred dispersing agent. Preferred retarding agents are calcium lignosulfonate, or other soluble salts of lignin sulfonic acids, as described, for example, in U.S. Pat. 2,141,570. As previously described, the retardation effect also opposes deterioration of work-ability of the slurry. Depending upon the precise effect sought, either one or both of these materials have been used in various oil-well cements in a concentration of 0.1 to 1.5 percent, based upon the weight of dry cement. In the composition of the present invention, satisfactory results are obtained with no more than about 0.75% each of dispersing and retarding agents at the usual temperatures encountered, thereby avoiding the use of large proportions of these relatively expensive chemicals. Also, in the composition of the present invention, it has been determined that the use of more than about 0.75% of these chemicals is usually of no benefit, and is sometimes detrimental, since the cement may fail to set up in time, or may have low strength. At higher temperatures, e.g. 230° F., it is not detrimental to use up to 1.0% retarder. The amount of retarder used is that amount which, at the well conditions to be encountered, will prevent the cement from setting up in less than about 10 to 30 hours, but will not prevent it from setting up to adequate strength in about 72 hours or less.

The colloidal clay and cement can be mixed together before mixing with water to form the cement slurry, or they can be mixed simultaneously with the mixing with water, or the clay can be added to a slurry of cement and water. Because of the difficulties encountered in mixing colloidal clay into a cement-water slurry, as a practical matter the cement and clay are usually mixed with the water simultaneously. Preferably, the clay and cement are blended in a dry condition for the subsequent admixture with water. The additives can be blended with the dry materials or added with the water used in preparing the slurry.

As is well known in the art, it is necessary to follow mixing procedures which involve the imparting of a high amount of shear to the slurry in order to avoid excessive loss of fluid from the slurry after it is pumped into the well. Such procedures for imparting shear in the field are well known and commonly used. For making laboratory tests of performance of cement slurries, comparable results are obtained by following prescribed procedures for the preparation of cement slurries as set forth in the aforesaid Bulletin API RP 10B.

The advantageous results obtained from the compositions of the present invention are illustrated by the following examples:

Cement slurries were prepared from Class H cement, bentonite, the sodium salt of the condensation product of sulfonated naphthalene and formaldehyde ("D" in the chart), calcium ligneous sulfonate ("R" in the chart) and water. The slurries were prepared by the method set forth in API Bulletin RP 10B, and the fluid loss of each slurry was measured by the high pressure method described on pages 17 and 18 of that bulletin. The following results were obtained:

| Test | Gel | Percent D | R | Water | Fluid, loss, cc. |
|---|---|---|---|---|---|
| 1 | 8 | 0.5 | 0.25 | 88 | 160 |
| 2 | 8 | 0.5 | 0.50 | 88 | 180 |
| 3 | 8 | 0.5 | 0.75 | 88 | 152 |
| 4 | 8 | 0.5 | 1.0 | 88 | 156 |
| 5 | 12 | 0.5 | 0.25 | 88 | 124 |
| 6 | 12 | 0.5 | 0.50 | 88 | 80 |
| 7 | 12 | 0.5 | 0.75 | 88 | 88 |
| 8 | 12 | 0.5 | 1.0 | 88 | 56 |
| 9 | 16 | 0.5 | 0.25 | 88 | 88 |
| 10 | 16 | 0.5 | 0.50 | 88 | 68 |
| 11 | 16 | 0.5 | 0.75 | 88 | 72 |
| 12 | 16 | 0.5 | 1.0 | 88 | 52 |
| 13 | 8 | 0 | 0.7 | 88 | 360 |
| 14 | 8 | 0.25 | 0.7 | 88 | 180 |
| 15 | 8 | 0.5 | 0.7 | 88 | 152 |
| 16 | 8 | 0.75 | 0.7 | 88 | 132 |
| 17 | 8 | 1.0 | 0.7 | 88 | 136 |
| 18 | 12 | 0 | 0.7 | 88 | 160 |
| 19 | 12 | 0.25 | 0.7 | 88 | 102 |
| 20 | 12 | 0.5 | 0.7 | 88 | 88 |
| 21 | 12 | 0.75 | 0.7 | 88 | 68 |
| 22 | 12 | 1.0 | 0.7 | 88 | 60 |
| 23 | 16 | 0 | 0.7 | 88 | 132 |
| 24 | 16 | 0.25 | 0.7 | 88 | 72 |
| 25 | 16 | 0.5 | 0.7 | 88 | 72 |
| 26 | 16 | 0.75 | 0.7 | 88 | 52 |
| 27 | 16 | 1.0 | 0.7 | 88 | 44 |
| 28 | 12 | 0.5 | 0.7 | 80 | 64 |
| 39 | 12 | 0.5 | 0.7 | 90 | 80 |
| 20 | 12 | 0.75 | 0.7 | 90 | 52 |

The slurry of sample 6 above was allowed to cure for 72 hours at 170° F., and was found to have a compressive strength of 1200 p.s.i. Sample 20 had a compressive strength of 1125 p.s.i. after 72 hours at 170° F., and sample 28 had a strength of 1535 p.s.i.

It is apparent from the above that cements with only 8% gel have excessive fluid loss, in that it exceeds the desired maximum of 120 cc. It is also apparent that fluid loss is excessive from higher gel cements if no dispersing agent is used. No substantial improvement of fluid loss characteristics results from increasing either the dispersing agent or the retarder to above about 0.75%.

In order to determine limits of proportions of ingredients, the following samples were prepared by the method of API Bulletin RP 10B:

| No. | Percent Gel | D | R | Water | Temperature, ° F. |
|---|---|---|---|---|---|
| A | 16 | 0.25 | 0.7 | 90 | 200 |
| B | 16 | 0.5 | 0.7 | 90 | 200 |
| C | 14 | 0.35 | 0.8 | 90 | 200 |
| D | 14 | 0.35 | 0.8 | 100 | 200 |
| E | 14 | 0.5 | 0.7 | 90 | 200 |
| F | 12 | 0.5 | 0.7 | 80 | 170 |
| G | 12 | 0.5 | 0.5 | 90 | 200 |
| H | 12 | 0.5 | 0.7 | 90 | 170 |

The API test showed fluid loss of each of these samples to be below 100 cc. The graph in the drawing illustrates the period of time during which each slurry had a viscosity low enough for pumping, and whether or not the sample set up to a satisfactory compressive strength in 72 hours. As previously stated, the maximum satisfactory pumping viscosity is considered to be about 30 poises, and in multiple completion wells the cement slurry is required to be below this viscosity for at least ten hours, and preferably for 30 hours. Also, in multiple completion wells the cement is normally required to set to a compressive strength of at least 700 p.s.i. in 72 hours. The curves in the drawing are not intended to be accurate representations of the precise changes in the cements over the time periods shown, but only to indicate whether or not a particular cement meets the above requirements. Thus in the drawing, the area above 30 poises and to the left of 10 hours is shaded, and the area below 700 p.s.i. and to the right of 72 hours is shaded. The curve of a cement must avoid these shaded areas to be considered satisfactory for multiple completion wells.

It is apparent from the curves that cements C and D are unsatisfactory in set strength. This is undoubtedly due to the high proportion of retarder used at the 200° F. temperature, since cement E, with slightly less retarder and slightly more dispersing agent, set up to a satisfactory strength. Note that cement D, with 100% water, never did set up, although it might have set up at a higher temperature, say 230° F., which is about the highest that will usually be encountered in oil wells.

The drawing also shows that cement G thickened too rapidly to allow its use in cementing casing in multiple completion wells, although its set strength was satisfactory. This is apparently due to its low proportion of retarder.

Cement A, however, is unsatisfactory both as to the viscosity of the slurry and the strength in 72 hours. This cement apparently had too little dispersing agent, since cement B, which differed from A in only an increase in dispersing agent, is satisfactory in both pumpability and strength.

The other cements, all of which contain between 0.30% and 0.75% of dispersing agent, and between 0.30% and 0.75% of retarding agent, are all satisfactory both as to pumpability and 72 hour strength. Note, too, that these cements all contain 80% to 90% water and 12% to 16% clay. It is apparent, however, that some variations from this amount of water is possible. It is preferable to always use at least 75% water, and under some conditions as little as 65% may be used. Often as much as 100% water is used with success, but amounts cause excessive fluid loss.

It is difficult to set precise limits on the proper proportions of the dispersing and retarding agents. The tests which have been run indicate that 0.25% of each is unlikely to be enough, under almost any conditions, whereas 0.35% or more almost always results in a satisfactory cement. The tests also indicate that proportions up to about 0.75% appear to improve the cement for the purposes of this invention, at the usual well temperatures of 140° F. to 200° F. whereas higher proportions are of little or no benefit at these temperatures and may be detrimental in many cases. Well conditions, however, may necessitate some change in these proportions. For example, up to 1.0% retarder may be found to be advantageous at higher temperatures. For average conditions, however, and in most wells, it has been found that proportions of dispersing and retarding agents between 0.30% and 0.75% give good results.

The preferred dispersing agent, the sodium salt of the condensation product of sulfonated naphthalene and formaldehyde, costs about $1.00 per pound at the present. Since cement costs only about $1.00 per 94 lb. sack, it is apparent that it is economically desirable to keep the proportion of dispersing agent as low as possible. The addition of 0.25% of dispersing agent raises the cost by $0.25 per sack of cement. The compositions of this invention allow the use of low proportions of these expensive dispersing agents, while using high proportions of the low cost clays, which provide high bulk at low cost. Furthermore, the use of fluid loss additives, which are also expensive, is completely avoided.

Thus a new cement composition has been devised which has all the characteristics of long pumping time, high compressive strength, and low fluid loss that are necessary for use in cementing multiple strings of tubing in oil wells, but which has a much lower cost than those compositions previously used, because of the larger proportions of gels which may be used, and the lower proportions of additives.

Various embodiments of the invention are shown in the drawing and described in the specification, but many variations thereof will be apparent to those skilled in the art. It is not practical to show or describe all the variations included within the invention, and therefore the embodiments described should be considered illustrative only, and not limiting, the scope of the invention being as broad as is defined by the appended claims. The form of the claims and the specification, including the Abstract, is adopted solely for easier reading understanding, and should not be considered in interpreting the scope of the invention claimed.

What is claimed is:
1. A cement composition consisting essentially of
   a portland cement,
   10 to 16 percent by weight of a collodial clay,
   from about 0.3% to about 0.75% of a dispersing agent selected from the soluble salts of aromatic sulfonic acids,
   from about 0.3% to about 1.0% of a retarding agent selected from the soluble salts of lignin sulfonic acids,
   and from about 65% to about 100% water, based on weight of dry cement.
2. A cement composition as defined by claim 1 wherein the cement is class H oil-well cement.
3. A cement composition as defined by claim 2 wherein the dispersing agent comprises a soluble salt of a sulfonic acid compound having a plurality of aromatic nuclei joined to an aliphatic nucleus.
4. A cement composition consisting essentially of
   a portland cement,
   10 to 16 percent by weight of a collodial clay,
   from about 0.3% to about 0.75% of a dispersing agent selected from the soluble salts of aromatic sulfonic acids,
   from about 0.3% to about 0.75% of a retarding agent selected from the soluble salts of lignin sulfonic acids,
   and from about 75% to about 90% water, based on weight of dry cement.
5. A cement composition as defined by claim 4 wherein the cement is class H oil-well cement.
6. A cement composition as defined by claim 5 wherein the dispersing agent comprises the sodium salt of the condensation product of sulfonated naphthalene and formaldehyde.

References Cited

UNITED STATES PATENTS

| | | | |
|---|---|---|---|
| 2,582,459 | 1/1952 | Salathiel | 106—90 |
| 2,711,219 | 6/1955 | Salathiel | 106—90UX |
| 2,840,483 | 6/1958 | Morgan et al. | 106—90X |
| 2,889,228 | 6/1959 | Beach | 106—90X |
| 3,215,548 | 11/1965 | Vollick | 106—90 |

TOBIAS E. LEVOW, Primary Examiner

H. M. S. SNEED, Assistant Examiner

U.S. Cl. X.R.

106—315; 166—293